United States Patent
Muthinti et al.

(10) Patent No.: US 11,714,045 B2
(45) Date of Patent: Aug. 1, 2023

(54) TECHNIQUES FOR CHARACTERIZING FILMS ON OPTICALLY CLEAR SUBSTRATES USING ELLIPSOMETRY

(71) Applicant: META PLATFORMS TECHNOLOGIES, LLC, Menlo Park, CA (US)

(72) Inventors: Gangadhara Raja Muthinti, Redmond, WA (US); Vivek Gupta, Sammamish, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 15 days.

(21) Appl. No.: 17/382,134

(22) Filed: Jul. 21, 2021

(65) Prior Publication Data
US 2023/0025649 A1 Jan. 26, 2023

(51) Int. Cl.
*G01N 21/21* (2006.01)
*G01B 11/06* (2006.01)

(52) U.S. Cl.
CPC ........ *G01N 21/211* (2013.01); *G01B 11/0625* (2013.01); *G01N 2021/213* (2013.01); *G01N 2201/12* (2013.01)

(58) Field of Classification Search
CPC .......... G01N 21/211; G01N 2021/213; G01N 2201/12; G01B 11/0625
USPC ........................................................ 356/630
See application file for complete search history.

(56) References Cited

U.S. PATENT DOCUMENTS

| | | | |
|---|---|---|---|
| 2005/0219529 A1* | 10/2005 | Nabatova-Gabain | G01N 21/211 356/369 |
| 2007/0024850 A1* | 2/2007 | Zaghloul | G01N 21/211 356/369 |
| 2015/0185135 A1* | 7/2015 | Martino | G01N 21/211 356/369 |

FOREIGN PATENT DOCUMENTS

KR 20190079143 A * 7/2019

OTHER PUBLICATIONS

Ming Di et al., Spectroscopic Ellipsometry Characterization of High-k films on SiO2/Si, College of Nanoscale Science and Engineering (CNSE), University at Albany; TEL Technology Center, America, LLC, Albany, NY; KLA-Tencor Corp., https://aip.scitation.org/doi/pdf/10.1063/1.3251202, 5 pages.

* cited by examiner

*Primary Examiner* — Tarifur R Chowdhury
*Assistant Examiner* — Omar H Nixon
(74) *Attorney, Agent, or Firm* — Artegis Law Group, LLP

(57) ABSTRACT

Various embodiments set forth techniques for characterizing films on optically clear substrates using ellipsometry. In some embodiments, a spectroscopic ellipsometer is configured to generate a light beam that has a relatively small spot size and is substantially absorbed by an optically clear substrate, thereby reducing or eliminating reflections from an interface between the substrate and air. Optical simulations can be performed to determine values for various parameters associated with the ellipsometer that minimize the reflections from the interface between the substrate and air and maximize reflections from an interface between a film and the substrate. In addition, graded films that include multiple layers can be analyzed using models of multiple layers.

20 Claims, 7 Drawing Sheets

TECHNIQUES FOR CHARACTERIZING FILMS ON OPTICALLY CLEAR SUBSTRATES USING ELLIPSOMETRY

BACKGROUND

Field of the Various Embodiments

Embodiments of this disclosure relate generally to optical metrology and, more specifically, to techniques for characterizing films on optically clear substrates using ellipsometry.

DESCRIPTION OF THE RELATED ART

Ellipsometry is an optical technique that can be used to characterize the thickness, uniformity, and material and optical properties of a sample. Ellipsometry measures the change in polarization upon reflection or transmission of light from a sample and compares the measured change in polarization with a model.

When a sample includes an optically clear (i.e., transparent) film on an optically clear substrate, reflections can be detected from a first interface between the film and the substrate as well as from a second interface between the substrate and air, which are also referred to herein as "backside reflections." The reflections from the first interface between the film and the substrate can be used to characterize the film. However, the backside reflections from the second interface between the substrate and air can introduce noise that is not easily distinguishable from the reflections from the first interface. Oftentimes, an ellipsometry signal resulting from reflections from both the first and the second interfaces cannot be used to accurately characterize the film.

As the foregoing illustrates, what is needed in the art are more effective techniques for characterizing optically clear films on optically clear substrates.

SUMMARY

One embodiment of the present disclosure sets forth a computer-implemented method for configuring an ellipsometer. The method simulating, for a plurality of values of parameters associated with an ellipsometer, one or more reflections of a light beam from a first interface associated with a sample and one or more reflections of the light beam from a second interface associated with the sample. The method further includes determining, based on the simulating, values of the parameters included in the plurality of values that maximize the one or more reflections from the first interface and minimize the one or more reflections from the second interface. In addition, the method includes configuring the ellipsometer based on the values of the parameters.

Another embodiment of the present disclosure sets forth a method for analyzing an ellipsometry signal. The method includes performing one or more operations that fit an ellipsometry signal to a first model, where the first model is associated with a first number of layers of a film and a first set of parameters. The method further includes performing one or more operations that fit the ellipsometry signal to a second model, where the second model is associated with a second number of layers of the film and a second set of parameters. In addition, the method includes selecting either the first model and values for the first set of parameters or the second model and values for the second set of parameters based on the fitting of the ellipsometry signal to the first model and the fitting of the ellipsometry signal to the second model.

Other embodiments of the present disclosure include, without limitation, a computer-readable medium including instructions for performing one or more aspects of the disclosed techniques as well as a computing device for performing one or more aspects of the disclosed techniques.

One advantage of the techniques disclosed herein is that, when an optically clear film on an optically clear substrate is being characterized using ellipsometry, backside reflections from an interface between the substrate and air that can introduce noise into the ellipsometry measurements are reduced or eliminated. In addition, the disclosed techniques permit graded films that include multiple layers to be characterized by modeling the multiple layers. These technical advantages represent one or more technological advancements over prior art approaches.

BRIEF DESCRIPTION OF THE DRAWINGS

So that the manner in which the above recited features of the various embodiments can be understood in detail, a more particular description of the disclosed concepts, briefly summarized above, may be had by reference to various embodiments, some of which are illustrated in the appended drawings. It is to be noted, however, that the appended drawings illustrate only typical embodiments of the disclosed concepts and are therefore not to be considered limiting of scope in any way, and that there are other equally effective embodiments.

DETAILED DESCRIPTION

In the following description, numerous specific details are set forth to provide a more thorough understanding of the various embodiments. However, it is apparent to one of skilled in the art that the disclosed concepts may be practiced without one or more of these specific details.

Configuration Overview

One or more embodiments disclosed herein relate to optical metrology and, in particular, to characterizing films on optically clear substrates using ellipsometry. In some embodiments, when analyzing an optically clear film on an optically clear substrate, a spectroscopic ellipsometer is configured based on various parameters to generate a light beam that has a relatively small spot size and is substantially absorbed by the substrate, thereby reducing or eliminating backside reflections from an interface between the substrate and air. The parameters can include an intensity or other property of a light source that emits the light beam, a frequency of rotation of a polarizer, wavelengths of light that are filtered out by a spatial filter, a z-direction alignment of a sample, a size of an aperture, and/or a combination of optical elements such as lenses that the light beam passes through. Optical simulations are performed to determine values for the parameters that minimize the backside reflections from the interface between the substrate and air while maximizing reflections from an interface between the film and the substrate. In addition, graded films that include multiple layers are analyzed using models of multiple layers in some embodiments.

System Overview

Figure 1:
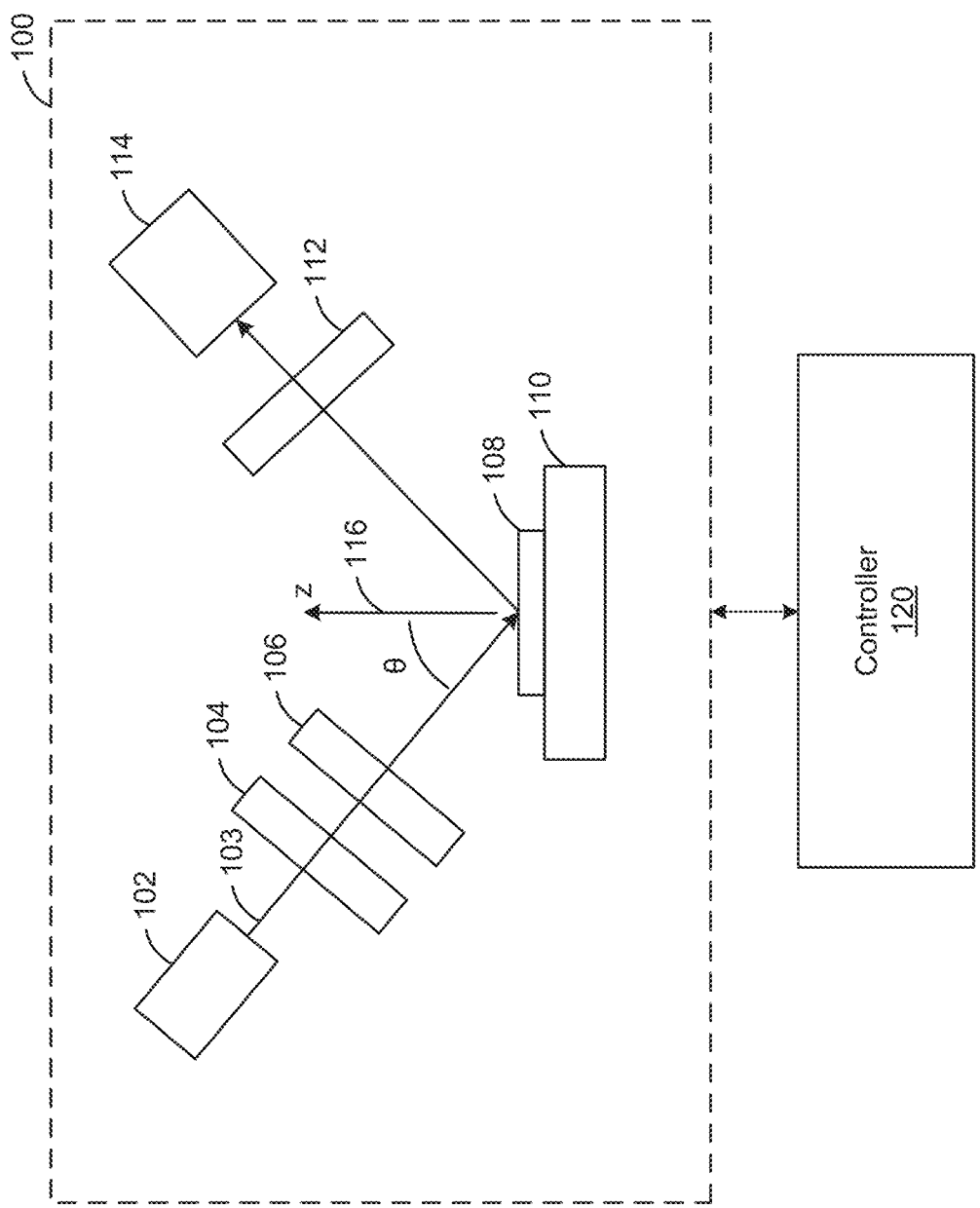
FIG. 1 is a schematic diagram illustrating a system for implementing one or more aspects of various embodiments.

FIG. 1 is a schematic diagram illustrating a system for implementing one or more aspects of various embodiments. As shown, a spectroscopic ellipsometer 100 includes a light source 102, a rotating polarizer 104, a spatial filter 106, a chuck 110 on which a sample 108 (also referred to sometimes as the "device under test") is placed, an analyzer 112, and a detector 114. Although a particular ellipsometer 100 is shown for illustrative purposes, ellipsometers that include additional and/or different components (e.g., other optical elements such as one or more compensators) may be used in some embodiments. Illustratively, the ellipsometer 100 is connected to a controller 120 that controls operation of the ellipsometer 100, which may include configuring components of the ellipsometer, taking measurements using the ellipsometer 100, and analyzing those measurements. The controller 120 can include any technically feasible computing device, such as the system described below in conjunction with FIG. 3.

In operation, the rotating polarizer 104 polarizes a light beam 103 that is emitted by the light source 102 and varies a state of the polarization. The polarized light beam passes through a spatial filter 106, which alters a structure of the light beam by, e.g., filtering out certain frequencies/wavelengths of light. The light beam that has passed through the spatial filter 106 is incident on the sample 108 and reflects off one or more layers of interest within the sample 108. The reflected light then passes through the analyzer 112 and is detected by the detector 114, which may be a charge-coupled device (CCD) or photo diode in some embodiments. The analyzer 112 includes another polarizer and can also rotate in some embodiments. An amount of light that passes through the analyzer 112 depends on an orientation of the polarizer in the analyzer 112 relative to elliptically polarized light that is reflected from the sample 108. The detector 114 converts the light that has passed through the analyzer 112 to an electronic signal that can be compared to an input polarization of the light beam 103 caused by the rotating polarizer 104 to determine a change in polarization. In turn, the change in polarization can be compared to a model in order to determine a thickness and the material and optical properties of the sample 108.

Figure 2:
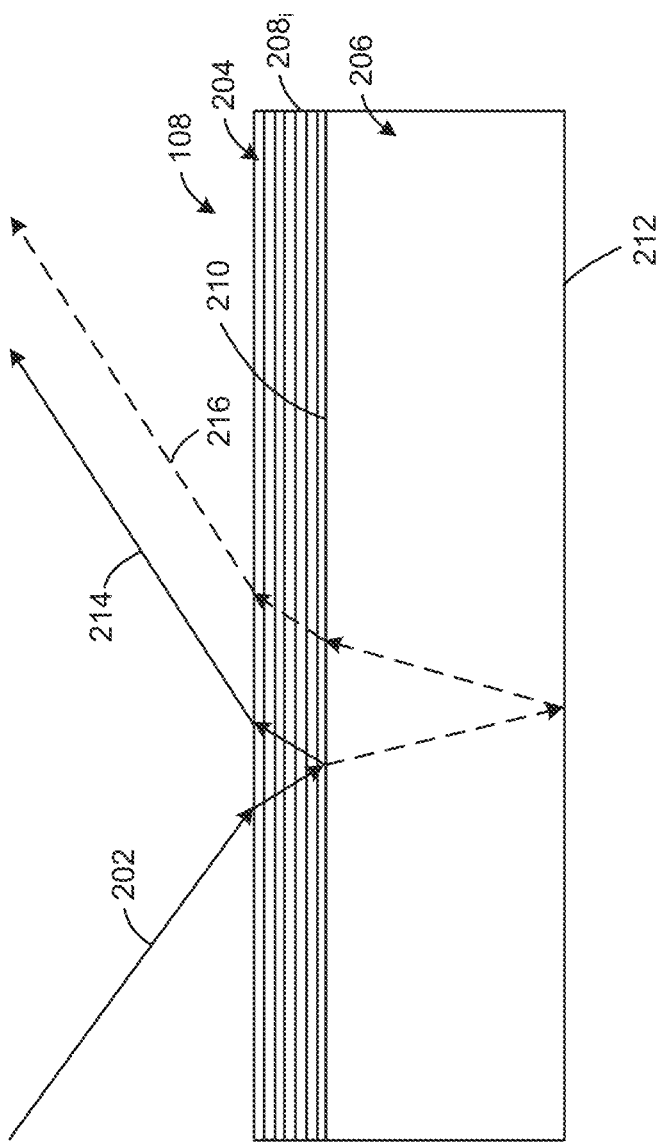
FIG. 2 illustrates interactions of light with a sample, according to various embodiments.

FIG. 2 illustrates in greater detail the sample 108 and interactions of light with the same, according to various embodiments. As shown, the sample 108 includes an optically clear (i.e., transparent) film 204 that is on an optically clear substrate 206. Illustratively, the film 204 is a non-uniform film that includes multiple layers $208_i$ (collectively referred to herein as layers 308 and individually referred to as a layer 208), which may have different thicknesses and material and optical properties. Alternatively, the film may be a single layer film. Further, the film 204 may be anisotropic (i.e., have different material and/or optical properties in different directions) in some cases. For example, the film 204 could have different refractive indices (n) in different directions. In addition, the film 204 may have different refractive indices for different wavelengths of light. In some embodiments, the film 204 and the substrate 206 may be constructed from any technically feasible materials. For example, the film 204 could be a high-index film, and the substrate 206 could be a silicon-based substrate.

Illustratively, light 202 (e.g., in the light beam 103) that is incident on the film 204 is refracted by the film 204. The refracted light is then partially reflected, and partially refracted, at an interface 210 between the film 204 and the substrate 206. The reflections described herein are primarily specular reflections. As shown, the light that is reflected at the interface 210 passes back through the film 204 and exits the film 204 as reflected light 214. On the other hand, the light that is refracted at the interface 210 passes through the substrate 206 and can be further reflected (as well as refracted) at a bottom interface 212 between the substrate 206 and air. As shown, the light that is reflected at the interface 212 passes back through the substrate 206 and the film 204, and then exits the film 204 as reflected light 216.

Although light reflected at the interface between the film 204 and the substrate 206 is shown as passing back through the film 204 and exiting as reflected light 216 for illustrative purposes, light can also be reflected through the film 204 multiple times. For example, light that is reflected at the interface 210 between the film 204 and the substrate 206 and passes back through the film 204 can be reflected at the interface between air and the film 204, pass through the film 204 again, be reflected at the interface 210 again, etc., before eventually exiting the film 204. For each such reflection through the film 204, a fraction of the light will be absorbed by the film 204, and the absorption can be a function of the wavelength of light and the material of the film 204. Similarly, light that is reflected at the interface 212 between the substrate 206 and air and passes back through the substrate 206 can also be reflected at the interface 210 between the film 204 and the substrate 206 or the interface between air and the film 204, pass through the substrate 206 or the film 204 and the substrate 206 again, be reflected at the interface 212 again, etc. before eventually exiting the film 204. All of the light that eventually exits the film 204 can be used to analyze the properties of all layers within the stack of the sample 208, including the substrate 206.

As described, reflections 214 from the interface 210 between the film 204 and the substrate 206 can be used to characterize the film 404. However, the backside reflections 216 from the interface 212 between the substrate 214 and air can introduce noise that is not easily distinguishable from the reflections 214 from the first interface. As a result, an ellipsometry signal produced by both of the reflections 214 and 216 cannot be used to accurately characterize the film 204. In some embodiments, the light source 102, the spatial filter 106, the rotating polarizer 104, and a position of the chuck 110, among other things, can be configured such that a light beam incident on the sample 108 has a relatively small spot size and is substantially absorbed by the substrate 206. As a result, the backside reflections 216 from the interface between the substrate 206 and air can be reduced or eliminated.

Returning to FIG. 1, the light source 102 is a source of light, such as a lamp, that emits the light beam 103 used to characterize the sample 108. In some embodiments, the light beam 103 may be an unpolarized, broadband light beam that includes a range of wavelengths (e.g., 190 nm to 950 nm) of light. To reduce a spot size of the light beam 103, in some embodiments, the light source 102 can be tuned to emit light having a reduced intensity that is associated with a relatively small spot size of the light beam 103

The rotating polarizer 104 is a polarizer, such as a linear or circular polarizer, that controls a polarization of the light beam 103 and is rotated during operation of the ellipsometer 100. As described, in some embodiments, the light source 102 emits a broadband light beam having various wavelengths of light. In such cases, some wavelengths of light may be emitted with higher intensities that are associated with larger spot sizes, and vice versa. In some embodiments, the rotating polarizer 104 is configured to rotate at a frequency that is tuned for particular wavelengths of light.

The spatial filter 106 is an optical device that alters a structure of the light beam 103. In some embodiments, the spatial filter 106 is configured to filter out certain frequencies/wavelengths of light in the light beam 103. Some wavelengths of light in the light beam 103 may be emitted with higher intensities that are associated with larger spot sizes, and vice versa. In some embodiments, the spatial filter 106 is configured to filter out the frequencies/wavelengths of light that are associated with larger spot sizes, thereby reducing an overall spot size of the light beam 103.

In some embodiments, apertures and and/or combinations of lenses (not shown) can also be used to control the spot size of a light beam. More generally, in some embodiments, the size of such an aperture, the combination of lenses, the frequency of a rotating polarizer, an angular placement of the light source relative to the sample, and/or properties of the light source, itself, can be used to optimize the spot size of light for a given wavelength or wavelengths of a light beam.

Although described herein primarily with respect to reducing the spot size of a light beam in particular ways, the spot size of a light beam can be reduced in any technically feasible manner in other embodiments. For example, in some embodiments, various optical elements, such other lenses and/or collimators, may be used to reduce the spot size of a light beam.

As described, reducing the spot size of the light beam 103 can reduce or eliminate backside reflections from an interface between an optically clear substrate and air, because a light beam having a relatively small spot size may be substantially absorbed by the substrate when the light beam passes through the substrate, reducing the probability that light in the light beam will reflect from an interface between the substrate and air. In addition to reducing the spot size of the light beam 103, the backside reflections from the interface between the substrate and air can be reduced by adjusting a z (height) alignment of the sample 108, which together with a rotation of the light source 102 can change an angle at which the light beam 103 is incident on the sample 108. The z alignment of the sample 108 can be adjusted in any technically feasible manner, such as by moving the chuck 110 up and down or by attaching the sample 108 to a carrier wafer. A z direction 116 and exemplar angle of incidence θ of the light beam 103 are shown in FIG. 1. A larger angle of incidence can cause the light beam 103 to be substantially absorbed by the substrate and not reflected from the interface between the substrate and air, because the light beam 103 will pass a longer distance through the substrate and be absorbed along the way. In addition, in some embodiments, a z alignment of the sample 108 and angle of incidence of the light beam 103 may be selected to maximize the reflections from an interface between a film and the substrate, because if the intensity (and/or the spot size) of the light beam that is incident on the sample 108 is too small, then reflections from the interface between the film and the substrate can be reduced, which can affect the process of characterizing the film.

In some embodiments, parameter values for an intensity of the light beam 103, a frequency of rotation of the polarizer 104, wavelengths that are filtered out by the spatial filter 106, a z (height) alignment of the sample 108, the size of an aperture, properties of the light source 102, and/or optical elements such as lenses that the light beam passes through that minimize backside reflections from an interface between an optically clear substrate and air and maximize reflections from an interface between a film and the substrate can be determined via simulations of those reflections. For example, in some embodiments reflections are simulated for different parameter values for the intensity of the light beam 103, the frequency of rotation of the polarizer 104, wavelengths that are filtered out by the spatial filter 106, the z alignment of the sample 108, the size of the aperture, the properties of the light source 102, and/or the optical elements, with one or more of the parameter values being incremented at each iteration of the simulations. In such cases, the simulations can be performed to simulate what the detector 114 detects. In particular, Fresnel reflection coefficients and Maxwell's equations can be used to calculate and simulate the expected reflected optical response at a given wavelength of light. In some embodiments, the nominal optical properties of materials within a sample, thickness, and/or roughness can be input by a user and included in a model, after which subsequent simulations and analysis of a sample using the model can be automated.

Based on the simulations, parameter values can be selected that reduce or eliminate the backside reflections from the interface between the substrate and air while maximizing the reflections from the interface between the film and the substrate. Then, the ellipsometer 100 can be configured based on the selected parameter values. In addition, the configured ellipsometer 100 can be tested to ensure that the backside reflections from the interface between the optically clear substrate and air is, in fact, reduced or eliminated. If the backside reflections are not reduced or eliminated, then the ellipsometer 100 may be re-configured using different parameter values (e.g., user input values or automatically determined values) in some embodiments.

After the backside reflections from the interface between the optically clear substrate and air are reduced or eliminated, reflected light from the interface between the film and the substrate can be detected by the detector 114 and analyzed to determine a thickness and the material and optical properties of the film. In some embodiments, graded films that include multiple layers can be analyzed using models of the multiple layers, as described in greater detail below in conjunction with FIGS. 4-5 and 7.

Although described herein primarily with respect to simulations to determine parameter values for reducing or eliminating backside reflections from an interface between a substrate and air, in some embodiments, the simulations can also be performed to determine parameter values relating to the detector 114 that improve the signal that is detected and analyzed. For example, when the detector 114 is a CCD or photo diode, then the simulations could also be used to optimize a signal-to-noise ratio and/or to enable a faster data acquisition time to the elliptically polarized light reflected from the sample 108.

Figure 3:
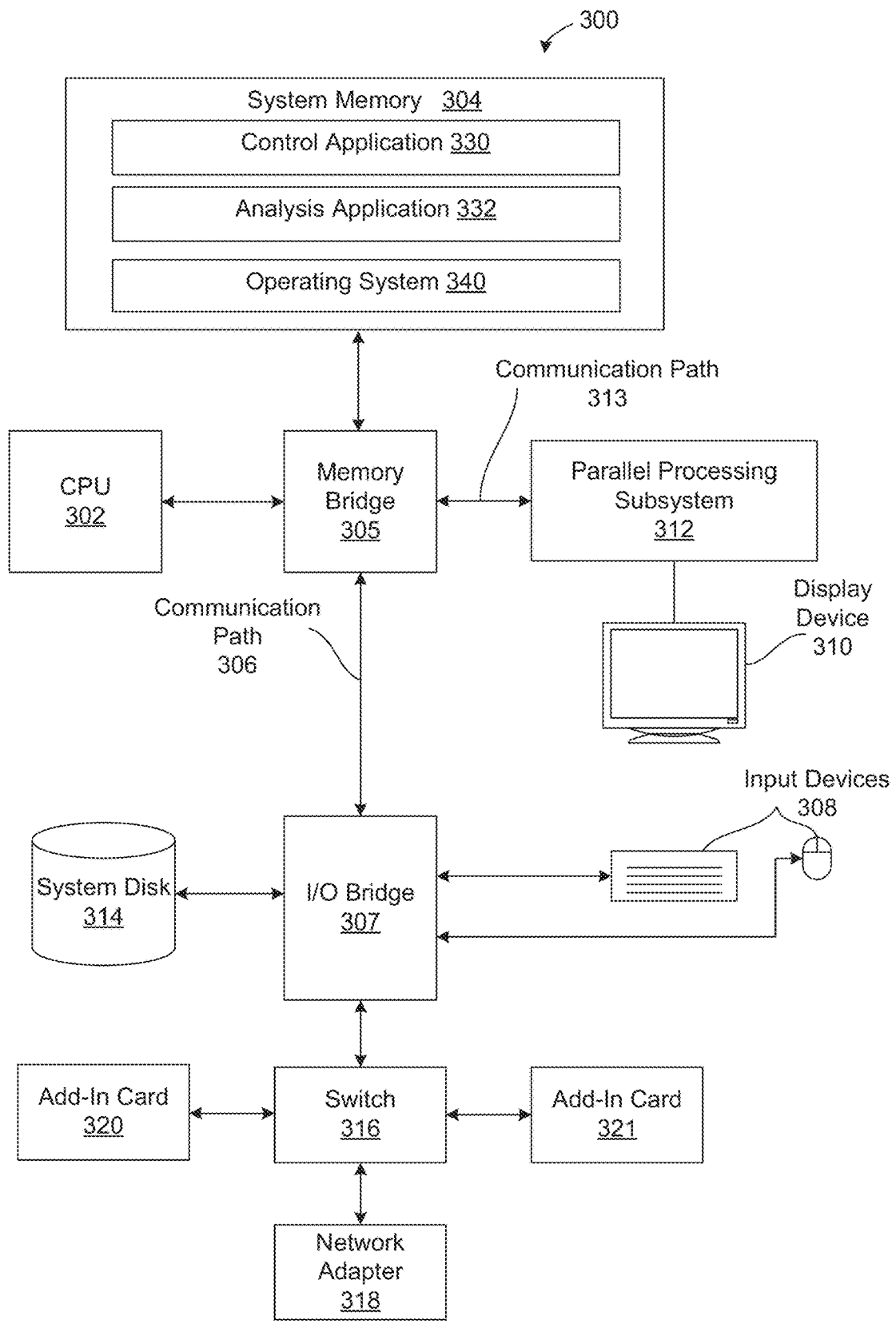
FIG. 3 illustrates a computing system in which control and analysis applications can execute, according to various embodiments.

FIG. 3 illustrates a computing system 300 in which in which control and analysis applications can execute, according to various embodiments. As shown, the system 300 includes, without limitation, a central processing unit (CPU) 302 and a system memory 304 coupled to one or more input devices 308, such as a keyboard, a mouse, a joystick, etc., and an I/O bridge 307 that is configured to forward the input information to the CPU 302 for processing via a communication path 306 and a memory bridge 305. A switch 316 is configured to provide connections between the I/O bridge 307 and other components of the system 300, such as a network adapter 318 and various add-in cards 320 and 321. Although two add-in cards 320 and 321 are illustrated, in some embodiments, the system 300 may not include any add-in cards or may only include a single add-in card, or the system 300 may include more than two add-in cards.

As also shown, the I/O bridge 307 is coupled to a system disk 314 that may be configured to store content, applications, and/or data for use by the CPU 302 and parallel processing subsystem 312. As a general matter, the system disk 314 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 307 as well.

In various embodiments, the memory bridge 305 may be a Northbridge chip, and the I/O bridge 307 may be a Southbridge chip. In addition, communication paths 306 and 313, as well as other communication paths within the system 300, may be implemented using any technically suitable protocols, including, without limitation, AGP (Accelerated Graphics Port), HyperTransport, or any other bus or point-to-point communication protocol known in the art.

In some embodiments, the parallel processing subsystem 312 comprises a graphics subsystem that delivers pixels to a display device 310 that may be any conventional cathode ray tube, liquid crystal display, light-emitting diode display, or the like. In such embodiments, the parallel processing subsystem 312 incorporates circuitry optimized for graphics and video processing, including, for example, video output circuitry. Such circuitry may be incorporated across one or more parallel processing units (PPUs) included within the parallel processing subsystem 312. In other embodiments, the parallel processing subsystem 312 incorporates circuitry optimized for general purpose and/or compute processing. Again, such circuitry may be incorporated across one or more PPUs included within the parallel processing subsystem 312 that are configured to perform such general purpose and/or compute operations. In yet other embodiments, the one or more PPUs included within the parallel processing subsystem 312 may be configured to perform graphics processing, general purpose processing, and compute processing operations. The system memory 304 may include at least one device driver configured to manage the processing operations of the one or more PPUs within the parallel processing subsystem 312.

In various embodiments, the parallel processing subsystem 312 may be or include a graphics processing unit (GPU). In some embodiments, the parallel processing subsystem 312 may be integrated with one or more of the other elements of FIG. 2 to form a single system. For example, the parallel processing subsystem 312 may be integrated with the CPU 302 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 304 could be connected to the CPU 302 directly rather than through the memory bridge 305, and other devices would communicate with the system memory 304 via the memory bridge 305 and the CPU 302. In other alternative topologies, the parallel processing subsystem 312 may be connected to the I/O bridge 307 or directly to the CPU 302, rather than to the memory bridge 305. In still other embodiments, the I/O bridge 307 and the memory bridge 305 may be integrated into a single chip instead of existing as one or more discrete devices. In some embodiments, any combination of the CPU 302, the parallel processing subsystem 312, and the system memory 304 may be replaced with any type of virtual computing system, distributed computing system, or cloud computing environment, such as a public cloud, a private cloud, or a hybrid cloud. Lastly, in certain embodiments, one or more components shown in FIG. 3 may not be present. For example, the switch 316 could be eliminated, and the network adapter 318 and add-in cards 320, 321 would connect directly to the I/O bridge 307.

Illustratively, the system memory 304 stores a control application 330, an analysis application 332, and an operating system 340. The operating system 340 may be, e.g., Linux®, Microsoft Windows®, or macOS®. In some embodiments, the control application 330 performs optical simulations to determine parameter values associated with a spectroscopic ellipsometer (e.g., the ellipsometer) that maximize reflections from an interface between an optically clear film and an optically clear substrate and minimize backside reflections from an interface between the substrate and air, as described in conjunction with FIGS. 1-2 and 4-6. In addition, the control application 330 can configure the ellipsometer based on the determined parameter values. In some embodiments, the analysis application 332 fits models of a film having different numbers of layers to a measured ellipsometry signal to determine a number of layers within the film and the material and optical properties of those layers, as described in conjunction with FIGS. 4-5 and 7.

Characterizing Films on Transparent Substrates

As described, when analyzing a film on an optically clear substrate, a spectroscopic ellipsometer in some embodiments can be configured to generate a light beam that has a relatively small spot size and substantially absorbed by the substrate, thereby reducing or eliminating backside reflections from an interface between the substrate and air. In addition, the film can be analyzed using models of multiple layers when the film is a graded film that includes multiple layers.

Figure 4A:
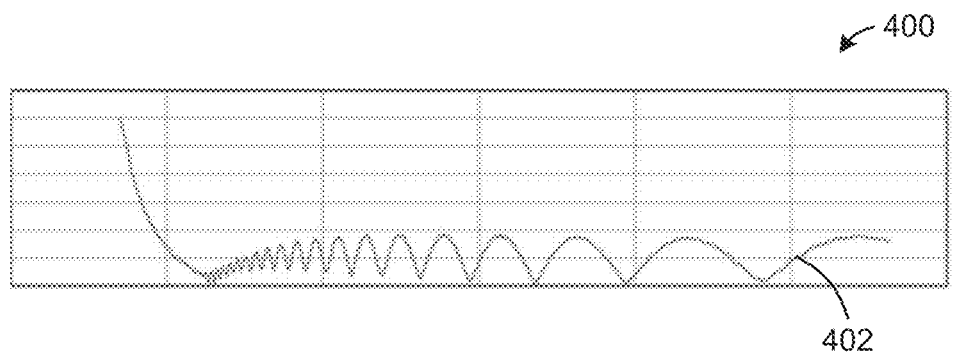
FIGS. 4A-B illustrate an exemplar ellipsometry signal before and after backside reflections are substantially eliminated, according to various embodiments.
Figure 4B:
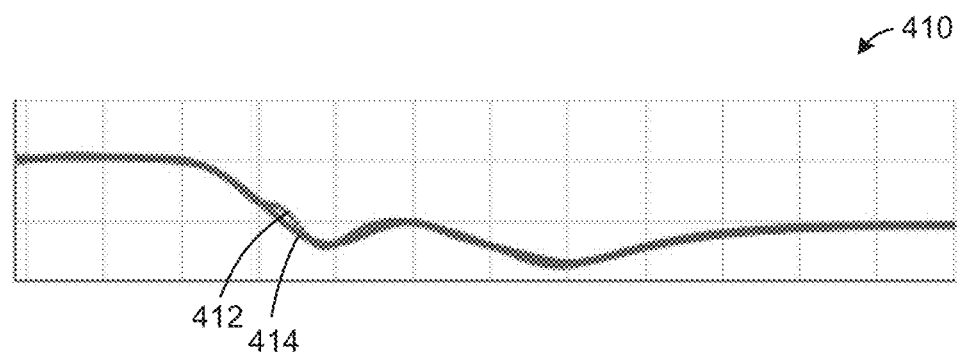

FIGS. 4A-B illustrate an exemplar ellipsometry signal before and after backside reflections are substantially eliminated, according to various embodiments. As shown in FIG. 4A, before backside reflections are eliminated, high depolarization is observed and a psi signal 402, which represents the ratio of an amplitude of light that is reflected from a sample including an optically clear film on an optically clear substrate to an amplitude of light that is incident on the sample, includes numerous peaks that are caused by backside reflections of light from an interface between the substrate and air. The peaks in the psi signal 402 are noise that cannot be easily differentiated from a signal caused by reflection of light from an interface between the film and the substrate. As a result, the film cannot be accurately characterized using the psi signal 402.

As described, in some embodiments, a spectroscopic ellipsometer (e.g., the ellipsometer 100) can be configured to reduce a spot size of a light beam and increase absorption of the light beam by an optically clear substrate, thereby reducing or eliminating backside reflections, by modifying an intensity and/or other propert(ies) of a light source (e.g., the light source 102), a frequency at which a polarizer (e.g., the rotating polarizer 104) rotates, wavelengths of a light beam that are filtered out by a spatial filter (e.g., spatial filter 106), a z alignment of a sample, a size of an aperture, and/or optical elements such as lenses that the light beam passes through. In some embodiments, parameter values associated with the light source intensity and/or other propert(ies), the frequency of rotation, the wavelengths that are filtered out by the spatial filter, the z alignment of the sample, the size of the aperture, and/or optical elements that minimize the backside reflections and maximize reflections from an interface between the film and the optically clear substrate are determined via simulations of those reflections.

FIG. 4B illustrates a psi signal 414 after backside reflections are substantially eliminated. As shown, the psi signal 414 does not include multiple peaks cause by backside reflections of light from the interface between the optically clear substrate and air. As a result, a film on the substrate can be more accurately characterized using the psi signal 414. In some embodiments, the analysis application 332 can analyze the psi signal 414 by fitting the signal 414 to a model. Any technically feasible model can be used in embodiments. For example, in some embodiments, the model may include a dispersion function that represents a refractive index as a function of wavelength.

Any technically feasible fitting techniques, such as a least-squares technique using the Levenberg-Marquardt algorithm or a modification thereof, may be used to fit the ellipsometry signal to a model in some embodiments. Experience has shown that, for some high index films, such as certain Titanium oxide and Niobium oxide films, a combination of a Tauc-Lorentz model and a Cody-Lorentz model can more accurately fit ellipsometry signals than other commonly used models, such as the Cauchy model. For example, the combination of the Tauc-Lorentz model and the Cody-Lorentz model can have form:

$$\epsilon_2(E) = A(E-E_g)^2/E^2 + A(E-E_g)^2, \quad (1)$$

where $\epsilon_2$ is the imaginary part of the dielectric function, A is a transition amplitude, E is a photon energy, and $E_g$ is a band gap.

In some embodiments, a different combination of the Tauc-Lorentz model and the Cody-Lorentz model is used to model each layer within a multi-layer film, such as the film 204 described above in conjunction with FIG. 2. In such cases, the combination of the Tauc-Lorentz model and the Cody-Lorentz model for each layer can be added together to obtain a model for the multi-layer film:

$$\epsilon_2(E) = \Sigma_{i-1}^{n} \epsilon_{2_i}(E), \quad (2)$$

where $\epsilon_{2_i}(E)$ is a combination of the Tauc-Lorentz model and the Cody-Lorentz model from equation (1), and n is the number of layers.

In addition, because the number of layers within a film is generally not known initially, the analysis application 332 can fit the psi signal 414 to multiple models that are associated with different numbers of layers. For example, the analysis application 332 can fit the psi signal 414 to a single-layer model that includes a combination of a Tauc-Lorentz model and a Cody-Lorentz model, and then to a two-layer model that includes a sum of two combinations of the Tauc-Lorentz model and the Cody-Lorentz model, etc., up to a maximum number of layers being modeled. Then, the analysis application 332 can select one of the models that corresponds to a particular number of layers, as well as associated parameter values, that best fit the psi signal 414. As a result, a number of layers within the film and parameter values that are associated with the material and optical properties of those layers can be determined. For example, the Tauc-Lorentz model and the Cody-Lorentz model include parameters that can be used to derive the refractive index (n) and the extinction coefficient (k) of layers within a film.

Figure 5A:
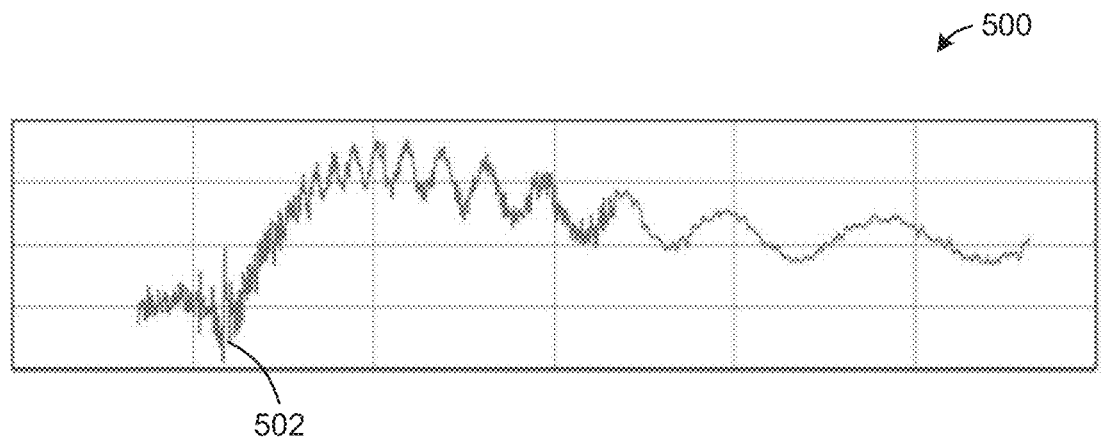
FIGS. 5A-B illustrate another exemplar ellipsometry signal before and after backside reflections are substantially eliminated, according to various embodiments.
Figure 5B:
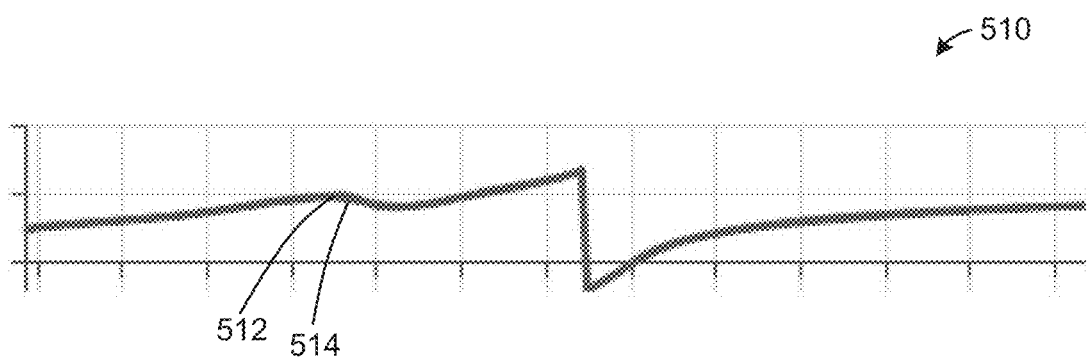

FIGS. 5A-B illustrate another exemplar ellipsometry signal before and after backside reflections are substantially eliminated, according to various embodiments. As shown in FIG. 5A, before backside reflections are eliminated, high depolarization is observed and a delta signal 502, which represents a phase difference between light that is reflected from a sample and light that is incident on the sample, includes multiple peaks that are caused by backside reflections of light from an interface between an optically clear substrate and air. Together, psi and delta signals (e.g., the psi and delta signals 402 and 502) describe an output elliptical polarization state after polarized light is reflected obliquely off of one or more layers in a sample. Similar to the psi signal 402 described above in conjunction with FIG. 4A, the delta signal 502 includes numerous peaks that are caused by backside reflections of light from an interface between an optically clear substrate and air and that can lead to inaccurate results when characterizing a film on the substrate. In some embodiments, the backside reflections can be reduced or eliminated by configuring a spectroscopic ellipsometer (e.g., the ellipsometer 100) based on various parameter values that minimize the backside reflections and maximize reflections from an interface between the film and the substrate, as described above in conjunction with FIG. 4A.

FIG. 5B illustrates a delta signal 512 after backside reflections are substantially eliminated. As shown, the delta signal 512 does not include multiple peaks cause by backside reflections of light from the interface between the optically clear substrate and air. As a result, the film on the substrate can be more accurately characterized using the delta signal 512. Similar to the description above in conjunction with FIG. 4B, in some embodiments, the analysis application 332 can analyze the delta signal 514 by fitting the signal 514 to a model that includes a combination of a Tauc-Lorentz model and a Cody-Lorentz model, or multiple such combinations for multi-layer films. More generally, the combination of the Tauc-Lorentz model and the Cody-Lorentz model can be used to calculate the psi, delta, and Mueller matrix polarization optical response from a sample.

Figure 6:
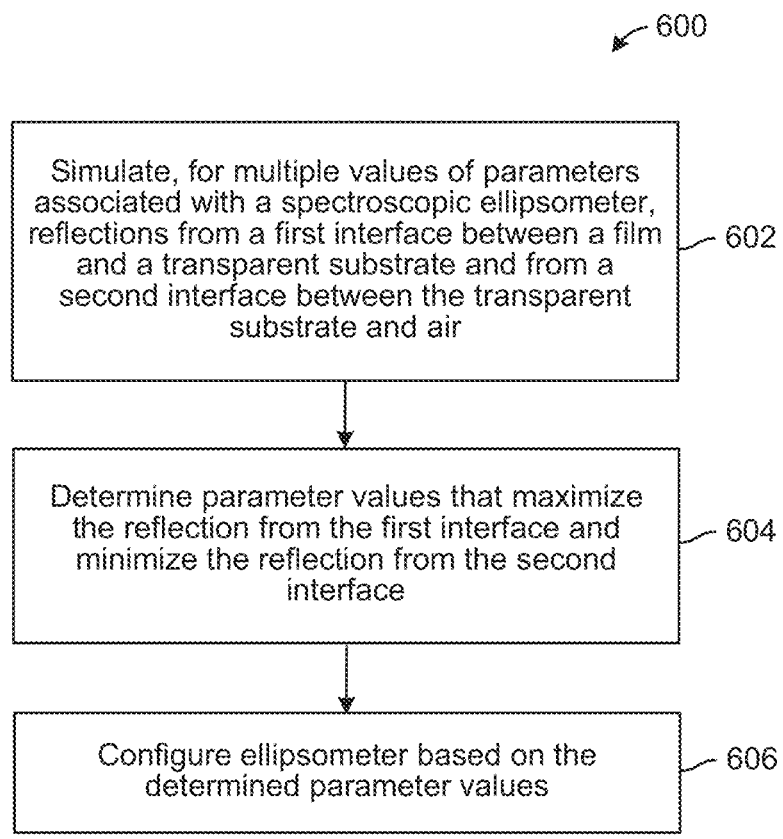
FIG. 6 is a flow diagram illustrating a method for configuring a spectroscopic ellipsometer to eliminate or reduce backside reflections from an interface between an optically clear substrate and air, according to various embodiments.

FIG. 6 is a flow diagram illustrating a method for configuring a spectroscopic ellipsometer to eliminate or reduce backside reflections from an interface between an optically clear substrate and air, according to various embodiments. Although the method steps are described with reference to the systems of FIGS. 1 and 3, persons skilled in the art will understand that any system may be configured to implement the method steps, in any order, in other embodiments.

As shown, a method 600 begins at step 602, where the control application 330 simulates, for multiple values of parameters associated with a spectroscopic ellipsometer, reflections from a first interface between a film and an optically clear substrate and from a second interface between the substrate and air. In some embodiments, optical simulations are performed for different values of parameters that include an intensity and/or other propert(ies) of a light source, a frequency at which a polarizer rotates, wavelengths of a light beam that are filtered out by a spatial filter, a z alignment of a sample, a size of an aperture, and/or optical elements such as lenses that the light beam passes through, as described above in conjunction with FIG. 1. In some embodiments, the simulations can also be performed to determine parameter values relating to a detector, such as parameters values that optimize a signal-to-noise ratio and/or to enable a faster data acquisition time to the elliptically polarized light reflected from the sample.

At step 604, the control application 330 determines, based on the simulation at step 602, parameter values that maximize the reflections from the first interface between the film and the substrate and minimize the reflections from the second interface between the optically clear substrate and air. As described, the parameters values that maximize the reflections from the first interface and minimize the reflections from the second interface may be associated with a relatively small spot size of the light beam and an angle of incidence that causes the light beam to be substantially absorbed by the substrate.

At step 606, the control application 330 configures the spectroscopic ellipsometer 100 based on the determined parameter values. In some embodiments, configuring the spectroscopic ellipsometer 100 can include transmitting one or more commands to the ellipsometer 100 and/or components thereof. For example, the rotating polarizer 104 could be commanded to rotate at a determined frequency. As another example, the chuck 110 could be commanded to move up or down based on the determined z alignment of the sample 108. In addition, the ellipsometer 100 that is configured at step 606 can be tested to ensure that backside reflections from the interface between the optically clear substrate and air is, in fact, reduced or eliminated. If the backside reflections are not reduced or eliminated, then the ellipsometer 100 may be re-configured using different parameter values in some embodiments.

Figure 7:
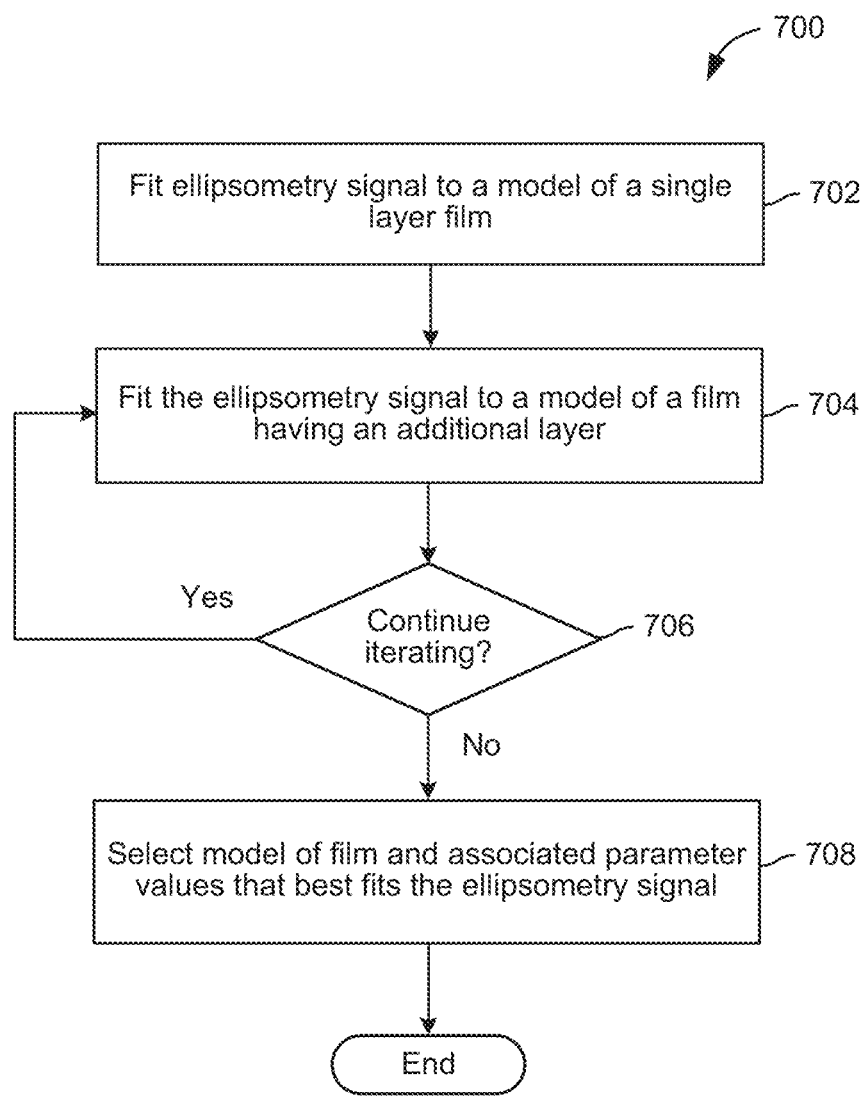
FIG. 7 is a flow diagram illustrating a method for analyzing an ellipsometry signal associated with a graded film, according to various embodiments.

FIG. 7 is a flow diagram illustrating a method for analyzing an ellipsometry signal associated with a graded film, according to various embodiments. Although the method steps are described with reference to the systems of FIGS. 1 and 3, persons skilled in the art will understand that any system may be configured to implement the method steps, in any order, in other embodiments. Although FIG. 7 is described with respect to a single ellipsometry signal, in some embodiments, multiple ellipsometry signals may be analyzed by repeating the steps of FIG. 7. For example, in the case of an anisotropic film having different refractive indices in different directions, the steps of FIG. 7 could be repeated for ellipsometry signals measured for each of those directions.

As shown, a method 700 begins at step 702, where the analysis application 332 fits an ellipsometry signal to a model of a single layer film. In some embodiments, the analysis application 332 can fit a psi and/or a delta signal to the model, which may be any technically feasible model of a single layer film. In some embodiments, the analysis application 332 can fit the ellipsometry signal to a model that is a combination of a Tauc-Lorentz model and a Cody-Lorentz model. Further, any technically feasible technique, such as a least-squares technique using the Levenberg-Marquardt algorithm or a modification thereof, may be used to fit the ellipsometry signal to the model in some embodiments. In some embodiments, the analysis application 332 can further determine a Mueller matrix polarization optical response by fitting to the model. In some embodiments, one or more other parameters, such a thickness of the single layer of firm, may be defined prior to the fitting of the ellipsometry signal to the model.

At step 704, the analysis application 332 fits the ellipsometry signal to a model of a film having an additional layer. Similar to step 702, any technically feasible technique can be used to fit the ellipsometry signal to any technically feasible model of a film having an additional layer. In some embodiments, the analysis application 332 can use a model that adds an additional combination of a Tauc-Lorentz model and a Cody-Lorentz model to the model used at a previous step (e.g., at step 702).

At step 706, if the analysis application 332 determines to continue iterating, then the method 700 returns to step 704, where the analysis application 332 fits the ellipsometry signal to a model of a film having yet another layer. For example, the analysis application 332 could continue iterating until the ellipsometry signal is fit to a model of a film having a maximum number of layers.

On the other hand, if the analysis application 332 determines to stop iterating, then at step 708, the analysis application 332 determines which of the models used at steps 702 and 704 best fits the ellipsometry signal. For example, in some embodiments, the analysis application 332 may identify a global minimum of the least squares distance between each of the fitted models and the ellipsometry signal. A model and values of associated parameters that are a closest fit to the ellipsometry signal are selected at step 708. The parameter values can then be used to determine the material and optical properties of layers of the film, such as the refractive index of each layer, as described above in conjunction with FIG. 4B.

One advantage of the techniques disclosed herein is that, when an optically clear film on an optically clear substrate is being characterized using ellipsometry, backside reflections from an interface between the substrate and air that can introduce noise into the ellipsometry measurements are reduced or eliminated. In addition, the disclosed techniques permit graded films that include multiple layers to be characterized by modeling the multiple layers. These technical advantages represent one or more technological advancements over prior art approaches.

1. In some embodiments, a computer-implemented method for configuring an ellipsometer comprises simulating, for a plurality of values of parameters associated with an ellipsometer, one or more reflections of a light beam from a first interface associated with a sample and one or more reflections of the light beam from a second interface associated with the sample, determining, based on the simulating, values of the parameters included in the plurality of values that maximize the one or more reflections from the first interface and minimize the one or more reflections from the second interface, and configuring the ellipsometer based on the values of the parameters.

2. The computer-implemented method of clause 1, wherein the sample comprises an optically clear film on an optically clear substrate.

3. The computer-implemented method of clauses 1 or 2, wherein the first interface comprises an interface between the optically clear film and the optically clear substrate, and the second interface comprises an interface between the optically clear substrate and air.

4. The computer-implemented method of any of clauses 1-3, wherein the parameters include at least one of a frequency of rotation of a polarizer, an intensity or other property of a light source that emits the light beam, one or more frequencies of light that are filtered out by a spatial filter, or a property of the light source.

5. The computer-implemented method of any of clauses 1-4, wherein the parameters include a z-direction alignment of the sample.

6. The computer-implemented method of any of clauses 1-5, wherein the parameters include one or more parameters associated with a signal-to-noise ratio or a data acquisition time of a detector.

7. The computer-implemented method of any of clauses 1-6, further comprising simulating the light beam passing through at least one of an aperture, a lens, or a collimator that reduces a spot size of the light beam.

8. The computer-implemented method of any of clauses 1-7, further comprising receiving an ellipsometry signal from the ellipsometer, and performing one or more operations that fit the ellipsometry signal to at least one model.

9. The computer-implemented method of any of clauses 1-8, further comprising re-configuring the ellipsometer based on the ellipsometry signal.

10. In some embodiments, one or more non-transitory computer-readable storage media include instructions that, when executed by at least one processor, cause the at least one processor to perform steps for configuring an ellipsometer, the steps comprising simulating, for a plurality of values of parameters associated with an ellipsometer, one or more reflections of a light beam from a first interface associated with a sample and one or more reflections of the light beam from a second interface associated with the sample, determining, based on the simulating, values of the parameters included in the plurality of values that maximize the one or more reflections from the first interface and minimize the one or more reflections from the second interface, and configuring the ellipsometer based on the values of the parameters.

11. The one or more non-transitory computer-readable storage media of clause 10, wherein the sample comprises an optically clear film on an optically clear substrate.

12. The one or more non-transitory computer-readable storage media of clauses 10 or 11, wherein the first interface is an interface between the optically clear film and the optically clear substrate, and the second interface is an interface between the optically clear substrate and air.

13. The one or more non-transitory computer-readable storage media of any of clauses 10-12, wherein the parameters include at least one of a frequency of rotation of a polarizer, an intensity or other property of a light source that emits the light beam, one or more frequencies of light that are filtered out by a spatial filter.

14. The one or more non-transitory computer-readable storage media of any of clauses 10-13, the steps further comprising simulating the light beam passing through at least one of a lens or a collimator that reduces a spot size of the light beam.

15. The one or more non-transitory computer-readable storage media of any of clauses 10-14, the steps further comprising receiving an ellipsometry signal from the ellipsometer, and performing one or more operations that fit the ellipsometry signal to at least one model.

16. The one or more non-transitory computer-readable storage media of any of clauses 10-15, the steps further comprising re-configuring the ellipsometer based on the ellipsometry signal.

17. In some embodiments, a computer-implemented method for analyzing an ellipsometry signal comprises performing one or more operations that fit an ellipsometry signal to a first model, wherein the first model is associated with a first number of layers of a film and a first set of parameters, performing one or more operations that fit the ellipsometry signal to a second model, wherein the second model is associated with a second number of layers of the film and a second set of parameters, and selecting either the first model and values for the first set of parameters or the second model and values for the second set of parameters based on the fitting of the ellipsometry signal to the first model and the fitting of the ellipsometry signal to the second model.

18. The computer-implemented method of clause 17, wherein at least of the first model or the second model comprises a combination of a Tauc-Lorentz model and a Cody-Lorentz model.

19. The computer-implemented method of clauses 17 or 18, further comprising determining, based on the first set of parameters or the second set of parameters that is selected, at least one of a refractive index or an extinction coefficient associated with at least one layer of the film.

20. The computer-implemented method of any of clauses 17-19, further comprising performing one or more operations that fit the ellipsometry signal to a third model, wherein the third model is associated with a third number of layers of the film and a third set of parameters, and wherein the selecting is further based on the fitting of the ellipsometry signal to the third model.

Any and all combinations of any of the claim elements recited in any of the claims and/or any elements described in this application, in any fashion, fall within the contemplated scope of the present disclosure and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations is apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for configuring an ellipsometer, the method comprising:
 simulating, for a plurality of values of parameters associated with an ellipsometer, one or more reflections of a light beam from a first interface associated with a sample and one or more reflections of the light beam from a second interface associated with the sample;
 determining, based on the simulating, values of the parameters included in the plurality of values that maximize the one or more reflections from the first interface and minimize the one or more reflections from the second interface; and
 configuring the ellipsometer based on the values of the parameters.

2. The computer-implemented method of claim 1, wherein the sample comprises an optically clear film on an optically clear substrate.

3. The computer-implemented method of claim 2, wherein the first interface comprises an interface between the optically clear film and the optically clear substrate, and the second interface comprises an interface between the optically clear substrate and air.

4. The computer-implemented method of claim 1, wherein the parameters include at least one of a frequency of rotation of a polarizer, an intensity or other property of a light source that emits the light beam, one or more frequencies of light that are filtered out by a spatial filter, or a property of the light source.

5. The computer-implemented method of claim 1, wherein the parameters include a z-direction alignment of the sample.

6. The computer-implemented method of claim 1, wherein the parameters include one or more parameters associated with a signal-to-noise ratio or a data acquisition time of a detector.

7. The computer-implemented method of claim 1, further comprising simulating the light beam passing through at least one of an aperture, a lens, or a collimator that reduces a spot size of the light beam.

8. The computer-implemented method of claim 1, further comprising:
receiving an ellipsometry signal from the ellipsometer; and
performing one or more operations that fit the ellipsometry signal to at least one model.

9. The computer-implemented method of claim 8, further comprising re-configuring the ellipsometer based on the ellipsometry signal.

10. One or more non-transitory computer-readable storage media including instructions that, when executed by at least one processor, cause the at least one processor to perform steps for configuring an ellipsometer, the steps comprising:
simulating, for a plurality of values of parameters associated with an ellipsometer, one or more reflections of a light beam from a first interface associated with a sample and one or more reflections of the light beam from a second interface associated with the sample;
determining, based on the simulating, values of the parameters included in the plurality of values that maximize the one or more reflections from the first interface and minimize the one or more reflections from the second interface; and
configuring the ellipsometer based on the values of the parameters.

11. The one or more non-transitory computer-readable storage media of claim 10, wherein the sample comprises an optically clear film on an optically clear substrate.

12. The one or more non-transitory computer-readable storage media of claim 11, wherein the first interface is an interface between the optically clear film and the optically clear substrate, and the second interface is an interface between the optically clear substrate and air.

13. The one or more non-transitory computer-readable storage media of claim 10, wherein the parameters include at least one of a frequency of rotation of a polarizer, an intensity or other property of a light source that emits the light beam, one or more frequencies of light that are filtered out by a spatial filter.

14. The one or more non-transitory computer-readable storage media of claim 10, the steps further comprising simulating the light beam passing through at least one of a lens or a collimator that reduces a spot size of the light beam.

15. The one or more non-transitory computer-readable storage media of claim 10, the steps further comprising:
receiving an ellipsometry signal from the ellipsometer; and
performing one or more operations that fit the ellipsometry signal to at least one model.

16. The one or more non-transitory computer-readable storage media of claim 15, the steps further comprising re-configuring the ellipsometer based on the ellipsometry signal.

17. A computer-implemented method for analyzing an ellipsometry signal, the method comprising:
performing one or more operations that fit an ellipsometry signal to a first model, wherein the first model is associated with a first number of layers of a film and a first set of parameters;
performing one or more operations that fit the ellipsometry signal to a second model, wherein the second model is associated with a second number of layers of the film and a second set of parameters; and
selecting either the first model and values for the first set of parameters or the second model and values for the second set of parameters based on the fitting of the ellipsometry signal to the first model and the fitting of the ellipsometry signal to the second model.

18. The computer-implemented method of claim 17, wherein at least of the first model or the second model comprises a combination of a Tauc-Lorentz model and a Cody-Lorentz model.

19. The computer-implemented method of claim 17, further comprising determining, based on the first set of parameters or the second set of parameters that is selected, at least one of a refractive index or an extinction coefficient associated with at least one layer of the film.

20. The computer-implemented method of claim 17, further comprising performing one or more operations that fit the ellipsometry signal to a third model, wherein the third model is associated with a third number of layers of the film and a third set of parameters, and wherein the selecting is further based on the fitting of the ellipsometry signal to the third model.

* * * * *